(12) United States Patent
Freed et al.

(10) Patent No.: US 11,699,430 B2
(45) Date of Patent: Jul. 11, 2023

(54) USING SPEECH TO TEXT DATA IN TRAINING TEXT TO SPEECH MODELS

(71) Applicant: International Business Machines Corporation, Armonk, NY (US)

(72) Inventors: Andrew R. Freed, Cary, NC (US); Vamshi Krishna Thotempudi, San Jose, CA (US); Sujatha B. Perepa, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 85 days.

(21) Appl. No.: 17/245,048

(22) Filed: Apr. 30, 2021

(65) Prior Publication Data

US 2022/0351715 A1 Nov. 3, 2022

(51) Int. Cl.
*G10L 13/08* (2013.01)
*G10L 13/06* (2013.01)
*G06N 20/00* (2019.01)

(52) U.S. Cl.
CPC .............. *G10L 13/08* (2013.01); *G06N 20/00* (2019.01); *G10L 13/06* (2013.01)

(58) Field of Classification Search
CPC ................................ G10L 13/08; G10L 13/06
See application file for complete search history.

(56) References Cited

U.S. PATENT DOCUMENTS

| | | | | |
|---|---|---|---|---|
| 5,893,058 A * | 4/1999 | Kosaka | ................... | G10L 15/32 |
| | | | | 704/238 |
| 7,349,847 B2 * | 3/2008 | Hirose | .................. | G10L 13/033 |
| | | | | 704/260 |
| 7,415,411 B2 * | 8/2008 | Reinhard | .............. | G10L 15/187 |
| | | | | 704/E15.02 |
| 7,742,919 B1 * | 6/2010 | Davis | ...................... | G10L 13/06 |
| | | | | 704/260 |
| 8,224,645 B2 * | 7/2012 | Conkie | ................... | G10L 13/07 |
| | | | | 704/266 |
| 8,321,224 B2 * | 11/2012 | Badino | ................... | G10L 13/08 |
| | | | | 704/260 |

(Continued)

FOREIGN PATENT DOCUMENTS

| CN | 104391673 A | * | 3/2015 | ............. G06F 3/167 |
|---|---|---|---|---|
| CN | 104391673 A | | 3/2015 | |

(Continued)

OTHER PUBLICATIONS

International Search Report and Written Opinion dated Jun. 28, 2022 from International Application No. PCT/IB2022/053095 filed Apr. 4, 2022.

(Continued)

*Primary Examiner* — Anne L Thomas-Homescu
(74) *Attorney, Agent, or Firm* — David K. Mattheis

(57) ABSTRACT

A system and method for providing a text to speech output by receiving user audio data, determining a user region-specific-pronunciation classification according to the audio data, determining text for a response to the user according to the audio data, identifying a portion from the text, where a region specific-pronunciation dictionary includes the portion, and using a phoneme string, from the dictionary selected according to the user region-specific pronunciation classification, for the word in a text to speech output to the user.

20 Claims, 4 Drawing Sheets

(56) References Cited

U.S. PATENT DOCUMENTS

| | | | | |
|---|---|---|---|---|
| 9,916,825 B2* | 3/2018 | Edrenkin | | G10L 13/08 |
| 11,295,730 B1* | 4/2022 | Mohajer | | G10L 15/1822 |
| 2009/0006097 A1* | 1/2009 | Etezadi | | G10L 13/08 |
| | | | | 704/277 |
| 2011/0307241 A1* | 12/2011 | Waibel | | G10L 15/26 |
| | | | | 704/2 |
| 2013/0110511 A1* | 5/2013 | Spiegel | | G10L 15/22 |
| | | | | 704/E15.001 |
| 2013/0179170 A1* | 7/2013 | Cath | | G10L 13/08 |
| | | | | 704/260 |
| 2013/0226576 A1* | 8/2013 | Jaiswal | | G10L 13/033 |
| | | | | 704/E15.005 |
| 2013/0289998 A1* | 10/2013 | Eller | | G10L 13/08 |
| | | | | 704/260 |
| 2014/0379334 A1* | 12/2014 | Fry | | G10L 15/22 |
| | | | | 704/235 |
| 2015/0066472 A1 | 3/2015 | Lee | | |
| 2015/0255069 A1* | 9/2015 | Adams | | G10L 15/187 |
| | | | | 704/236 |
| 2017/0092258 A1* | 3/2017 | Edrenkin | | G10L 13/08 |
| 2017/0221475 A1* | 8/2017 | Bruguier | | G10L 15/26 |
| 2018/0032884 A1* | 2/2018 | Murugeshan | | G06F 40/35 |
| 2018/0190269 A1* | 7/2018 | Lokeswarappa | | G09B 19/06 |
| 2019/0258704 A1* | 8/2019 | Mertens | | G10L 15/22 |
| 2020/0175968 A1* | 6/2020 | Donati | | G10L 15/187 |
| 2020/0193971 A1* | 6/2020 | Fei | | G06F 40/44 |
| 2020/0228476 A1* | 7/2020 | Fejes | | H04L 43/50 |
| 2020/0342851 A1* | 10/2020 | Patel | | G06N 3/04 |
| 2020/0372110 A1* | 11/2020 | Kaul | | G06F 40/242 |

FOREIGN PATENT DOCUMENTS

| | | |
|---|---|---|
| CN | 110827803 A | 2/2020 |
| TW | 413105 B | 10/2013 |

OTHER PUBLICATIONS

Liberman, et al., "Text Analysis and Word Pronunciation in Text-to-Speech Synthesis", ResearchGate, Jan. 1992, 22 pgs, Murray Hill, NJ, <https://www.researchgate.net/publication/230876257>.

Mell et al., "The NIST Definition of Cloud Computing", National Institute of Standards and Technology, U.S. Deparlment of Commerce, NIST Special Publication 800-145, Sep. 2011, 7 pages.

* cited by examiner

USING SPEECH TO TEXT DATA IN TRAINING TEXT TO SPEECH MODELS

FIELD OF THE INVENTION

The disclosure relates generally to the use of speech to text (STT) data in the training of text to speech (TTS) models. The disclosure relates particularly the selection of customized speech to text phoneme sequences for use in text to speech outputs.

BACKGROUND

Accent classification models enable the recognition and classification of a speaker's accent from a minimal amount of audio data. Such models evaluate the phonemes used by the speaker for keywords and identify the accent of the user by matching the keyword phonemes used with a database of keyword phoneme sequences categorized according to different accent classifications.

Speech to text systems receive audio data and generate textual output according to identification of audio phoneme sequences in the data and the use of one or more classification models to classify the identified phoneme sequences as particular words.

Text to speech systems generate audio output by scanning a string of text data and matching the respective portions of the text data with database entries containing default phoneme sequences for the identified text portions. Such systems then generate synthetic voice output of the overall phoneme sequence associated with the text sequence, including the addition of appropriate silences between words and associated with punctuation present in the original text sequence.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable the automated generation of text to speech responses according to a user's local pronunciation differences.

Aspects of the invention disclose methods, systems and computer readable media associated with providing a text to speech output by receiving user audio data, determining a user's region-specific-pronunciation classification according to the audio data, determining text for a response to the user according to the audio data, identifying a portion from the text, where a region-specific-pronunciation dictionary includes the portion, and using a phoneme string, from the dictionary selected according to the user's region-specific pronunciation classification, for the portion in a text to speech output to the user.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
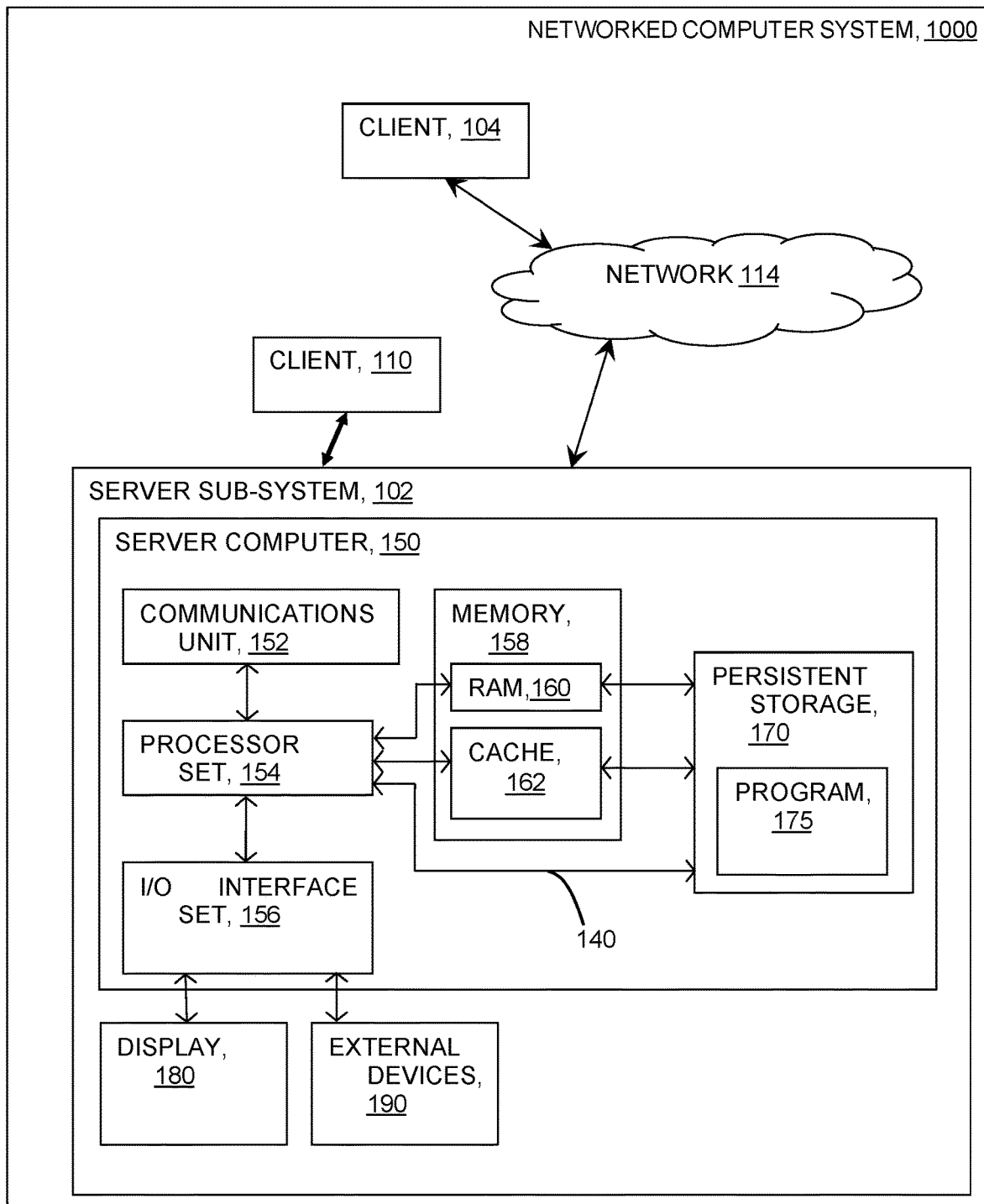
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

Currently Speech to Text (STT) and Text to Speech (TTS) systems require separate, lengthy training processes, especially during domain adaptation. A lot of care must be taken to capture user pronunciations of domain terminology while training an STT model. Training TTS systems separately requires trying to find a one-size-fits-all "best" synthesis of phoneme sequences for domain terminology in TTS readouts. Disclosed embodiments enable determination of region-specific phoneme sequences for domain terminology from previously evaluated STT data. Disclosed embodiments provide a Text to Speech system that can adapt domain-specific terminology to the accent of the user with whom the system is interacting. This increases familiarity and usability with the TTS system for users of various backgrounds having varying dialects and accents. Disclosed embodiments provide a comfortable system that adapts its pronunciation patterns of unfamiliar words to the user.

As used herein the term domain refers to a subset of words or technical terms and phrases from a particular language relating to a specific area, such as medical terms, engineering or other technical terms, industry jargon, slang, colloquialisms, local idiom, etc. For any element of a domain, there may be multiple local variations both in terms of pronunciation and actual words, depending upon the regional dialect and accent of an individual user. As an example, English pronunciations may vary depending upon a user's country of origin, as well as different regions within countries, and whether English is the user's first language or not. In an embodiment, the system receives defined domain words from an administrator or other individual. In this embodiment, the system and method define domain specific words using historic user input and available dictionaries to identify domains and domain specific words.

Aspects of the present invention relate generally to question answering systems and, more particularly, to providing phoneme sequences for domain specific words or phrases matching the local pronunciation accent or dialect of a user for answering user questions. In embodiments, a question answering (QA) system receives audio data including a question from a user, including the user's local pronunciation differences, or the user's local accent or dialect. The system identifies and classifies the user's accent using a trained machine learning model. The system converts the user's audio data to text using a speech to text converter with consideration for the identified local pronunciations of the user. The system evaluates the user's question using a decision tree or similar model and determine a response to the user's question. The system scans the determined response to identify one or more portions of the response. For each identified portion, the method searches a region-specific pronunciation dictionary for entries matching the words or phrases of the portion and corresponding to the identified accent of the user. The method formulates a response using the corresponding local variants for the identified portions. The method extract phoneme sequences for the local pronunciation of the portions corresponding to the identified accent of the user. The method generates audio data corresponding to the local textual response using text to speech generator and the phoneme sequences for the local pronunciations. The method provides the generated text to speech output including the pronunciations of identified portions in the accent of the user, as audio output to the user.

In an embodiment, the systems and method receive audio data from a system user. The method transcribes the audio data using a speech to text model and then associates the respective audio data portions with each n-gram, word, and phrase of the speech to text output. The method then identifies the phoneme strings of the audio data associated with the words of the text and identifies the accent of the user according to a model trained using labeled local pronunciations for a wide variety of commonly used words of a target language. For example, training the system for use with English speakers includes training the model using labeled audio data including local pronunciations of English words commonly used when interacting with a chatbot, voicebots, or other automated conversation system. In this embodiment, the method receives the labeled training data, converts the speech data to text and associates the identified phonemes with the speech to text output. The model utilizes the accent labels for the data in establishing the network node weights of a classification model adapted to receive audio data and identify the data according to the accent of the user.

Aspects of the invention provide an improvement in the technical field of QA systems. Conventional QA systems utilize static decision trees and a default set of phonemes in generating audio data outputs using text to speech generators after determining entities and intents of a user's input audio. Disclosed embodiments build upon such systems by identifying the accent of the user and customizing the audio text to speech response for that user using a dictionary having entries for n-grams, words, and phrases. Each entry has a phoneme sequences defined according to one or more user accents. For example, for any defined accent the dictionary has a set of domain and accent specific entries associated with that accent. In addition, the dictionary can be viewed as having multiple different accent phoneme sequences for at least some entries, providing phoneme pronunciation sequences for American, Indian, English, Scottish, Irish, and Australian versions of a single dictionary entry.

Aspects of the invention also provide an improvement to computer functionality. In particular, implementations of the invention are directed to a specific improvement to the way QA systems operate, embodied in the continually adjusted phoneme sequences associated with the respective terms of various domains and different accents. Disclosed methods start with a region-specific dictionary of phoneme sequences for different term-accent combinations. Over time the most common phoneme sequence for any particular term-accent combination may be altered for that dictionary entry based upon changes to the most common pronunciation for the term in the particular accent received as input audio data from system users, applied as input data in the ongoing training of the dictionary used by the systems and methods.

As an overview, a QA system is an artificial intelligence application executed on data processing hardware that answers questions pertaining to a given subject-matter domain presented in natural language. The QA system receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA system. The document may include any file, text, article, or source of data for use in the QA system. For example, a QA system accesses a body of knowledge about the domain, or subject matter area (e.g., financial domain, medical domain, legal domain, etc.) where the body of knowledge (knowledge-base) can be organized in a variety of configurations, such as but not limited to a structured repository of domain-specific information, such as ontologies, or unstructured data related to the domain, or a collection of natural language documents about the domain.

In an embodiment, the QA system further identifies the accent of the user form audio data received from the user. The system determines a response to the user input and then modifies that response according to matches between response portions and entries in a region-specific pronunciation dictionary developed by disclosed embodiments for the purpose of providing customized audio text to speech outputs using the accent of the user. In this embodiment, the method generates audio output in response to the user's input where the audio output includes one or more phoneme sequences using the identified accent of the user to express the word and phrases generated by the QA response generator.

In an embodiment, one or more components of the system can employ hardware and/or software to solve problems that are highly technical in nature (e.g., receiving user audio data, determining a user region-specific-pronunciation classification according to the audio data, using speech to text analysis, phoneme detection and a trained accent classifying machine learning classification architecture, determining text for a response to the user according to the audio data and, for example, a decision tree suing intents and entities extracted from the speech to text data, identifying a portion from the text, having a match in a developed region-specific pronunciation dictionary, using a phoneme string, from the dictionary selected according to the user region-specific pronunciation classification, for the portion in a generated text to speech output to the user, etc.). These solutions are not abstract and cannot be performed as a set of mental acts by a human due to the processing capabilities needed to facilitate the generation of generated text to speech outputs customized according to a system user's accent, for example. Further, some of the processes performed may be performed by a specialized computer for carrying out defined tasks related to generating user accent customized text to speech phoneme strings. For example, a specialized computer can be employed to carry out tasks related to generating customized text to speech outputs for a question answering system or the like.

In an embodiment, the method builds a region-specific pronunciation dictionary for use in providing user specific customized text to speech outputs for an automated conversation system. In building the dictionary, the method receives audio data including voice sample from multiple individuals. Each audio data sample includes a label indicating the accent of the providing individual. In this embodiment, the method performs speech to text upon the audio data samples as well as phoneme analysis of the audio data yielding a string of phoneme sequences from the data. The method then correlates the phoneme sequences and the text from the audio creating text—phoneme sequence pairings for each word n-gram and/or phrase of the text. In an embodiment, for domain specific words, the method provides a script or other prompt for individuals to follow when creating the audio data. In this embodiment, the method ensures that domain words and phrases of interest are included in the audio samples from the individuals.

In an embodiment, the method sorts the phoneme-text pairings according to each labeled accent. For each accent, the method identifies the most common phoneme sequence for each word of the text including and especially the domain specific words. In this embodiment, the phoneme sequences sorted according to labeled accent provide a basis for identifying a user's accent by comparing all user audio data input phoneme sequences t the sets of phoneme sequences labeled according to accent.

In an embodiment, the method compares phoneme sequences for words used across multiple accents to identify phoneme sequences unique to a single accent or a subset of accents as a step toward enabling classification of a user's accent from a small set of keyword inputs.

For domain specific or accent specific words having a plurality of differing pronunciations within the labeled data for an accent, the method selects the most common pronunciation as the pronunciation representative of the labeled accent. The method indicates the relative ranking of each of the multiple pronunciations for the word or phrase in the accent specific dictionary entry for the word or phrase. Once in use, the dictionary undergoes continuous scrutiny to evaluate accent specific pronunciations to determine shifts in the most common pronunciation for any particular word or phrase. The method maintains a cumulative count of the occurrences of the varying pronunciations for each accent specific word and modifies dictionary entries for a word after the relative ranking of different pronunciations for that word change due to user input including the word or phrase. After building the region-specific pronunciation dictionary including accent specific phoneme sequences for words, the method utilizes the dictionary entries in generating text to speech audio outputs as set forth below.

As an example, the method receives audio data inputs from a number of individuals including individual shaving each of an Indian—English or American—English accent. For each individual, the method revoices audio data including the individual's pronunciation of the word "periodontal". Exemplary pronunciations of the word for each of the two accents are set forth in Table 1.

TABLE 1

| USER | ACCENT | PHONEME SEQUENCE |
| --- | --- | --- |
| User1 | US | [.0px.2rY.0x.1dan.0tx1] |
| User2 | US | [.0px.2rY.0x.1dan.0tx1] |
| User3 | US | [.0px.2rY.0x.1dan.0tx1] |
| User4 | US | [.0px.1rY.0x.2dan.0tx1] |
| User5 | India | [.2pi.0x.2rY.0x.1dan.0tx1] |
| User6 | India | [.2pi.0x.2rY.0x.1dan.0tx1] |
| User7 | India | [.2pi.0x.1rY.0x.1dan.0tx1] |

From Table 1, the method determines that the most common phoneme sequence for a US accent is [.0px.2rY.0x.1dan.0tx1]. The most common pronunciation for an Indian accent is [.2pi.0x.2rY.0x.1dan.0tx1]. For the dictionary entry for "periodontal", the method notes the multiple phoneme sequences for each accent as well as indicating which phoneme sequence is most common for each accent.

In an embodiment, a method receives user audio data associated with an automated conversation system, such as a question answering system. The audio data may be received directly from a user through a microphone connected to the system, or may be received indirectly via a user microphone, the user's computing system, a communications network, a receiving computing system associated with the QA system, and one or more intermediary computing systems including possibly edge cloud and cloud computing resources. In this embodiment, the audio data includes a digital audio file, such as a.wav or similar data file containing the digitized version of the user's spoken input. In one sense, the audio data file includes a string of digitized phoneme sequences corresponding to a spoken string of words from the user.

In an embodiment, the method conducts speech to text conversion upon the audio data, yielding the string of text corresponding to the user's spoken input. The method further analyzes the audio data resulting in a string of identified phonemes corresponding to the audio data. The method correlates the string of phonemes to the string of text, associating particular phoneme sequences to each word, partial word, or combination of words, of the string of text. In this embodiment, the method matches correlated phoneme sequence—word combinations to identify an accent or other local pronunciation for the user. In an embodiment, the method uses a trained machine learning classification model, such as a convolutional neural network, a recurrent neural network, a deep learning neural network, or a generative classifier, such as a generative adversarial network od variational autoencoder, to classify the accent of the user according to the phoneme sequence—word correlations of the user's input audio data. In an embodiment, the method receives a previously trained the machine learning classification model outside the scope of the disclosed inventions. The trained model provides an accent classification for the user as an output.

The method analyzes the string of text using a natural language understanding, or natural language processing algorithm to extract entities and intents from the string of text. In an embodiment, the method processes the extracted entities and intents using a decision tree including parent nodes associated with various entities and intents and child nodes for each parent associated with possible system responses to the user's input. The output of the decision tree includes a text string selected by the tree in response to the user's input.

In an embodiment, the method scans the response text and parses the text into portions such as n-grams, words or phrases. The method then correlates the identified portions of the scanned text with entries in the region-specific pronunciation dictionary. The method correlates portions to dictionary entries having a corresponding word-phoneme sequence for the identified accent of the current system user.

In this embodiment, the method identifies the most common accent specific phoneme sequence identified portions having a matched entry for the identified accent. The method generates an overall phoneme sequence for the text response. The overall phoneme sequence includes those phoneme sequences extracted from the relevant region-specific pronunciation dictionary entries. For text portions absent from, and lacking a match in the region-specific pronunciation dictionary, the method uses a default phoneme sequence associated with those text portions. The method provides the final overall phoneme sequence for the response text as a text to speech output to the user.

In an embodiment, the method utilizes a decision tree including accent-specific child nodes for at least some of the parent nodes of the tree. In this embodiment, the method identifies parent decision nodes relevant to the user input. The method identifies a decision and corresponding set of child nodes relevant to the input, according to the intents and entities of the input, and then selects a child node according to the identified accent of the user. In this embodiment, there may be multiple child nodes for a particular parent node, where a set of child nodes differ according to accent but are otherwise equivalent conceptual responses to a decision by the parent node. In practice, the method proceeds through the decision tree to the parent node, evaluates the decision of the parent according to the details of the user input, selects the set of otherwise equivalent child nodes as a response, and then selects that child node matching the identified accent of the user, as the output response for the user. In this embodiment, the method then proceeds as set forth above in generating the phoneme sequences matching the identified accent of the user for the generation of the text to speech output for the user.

As an example, two users call the automated question answering system, one user having a U.S. English accent, and one having an Indian English accent. The U.S. user asks: "How much is a deep cleaning?" The system responds with: "For regular cleanings your co-pay is $25. For [.0px.2rY.0x.1dan.0txl] your co-pay is $50". In contrast, the Indian user asks: "What's my out of pocket for a cleaning visit?", and the system responds: "For regular cleanings your co-pay is $25. For [.2pi.0x.2rY.0x.1dan.0txl] your co-pay is $50".

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise automated question answering program (not shown) together with sufficient computing resource (processor, memory, network communications hardware) to execute the program. Client devices 104 and 110 may function as user access points for the QA system enabling users to provide input and receive outputs from the system. Total system functionality may occur across the set of computing devices as well as across further environment resources such as edge cloud and cloud resources. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the automated conversation program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone for receiving user audio data directly, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., automated conversation program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
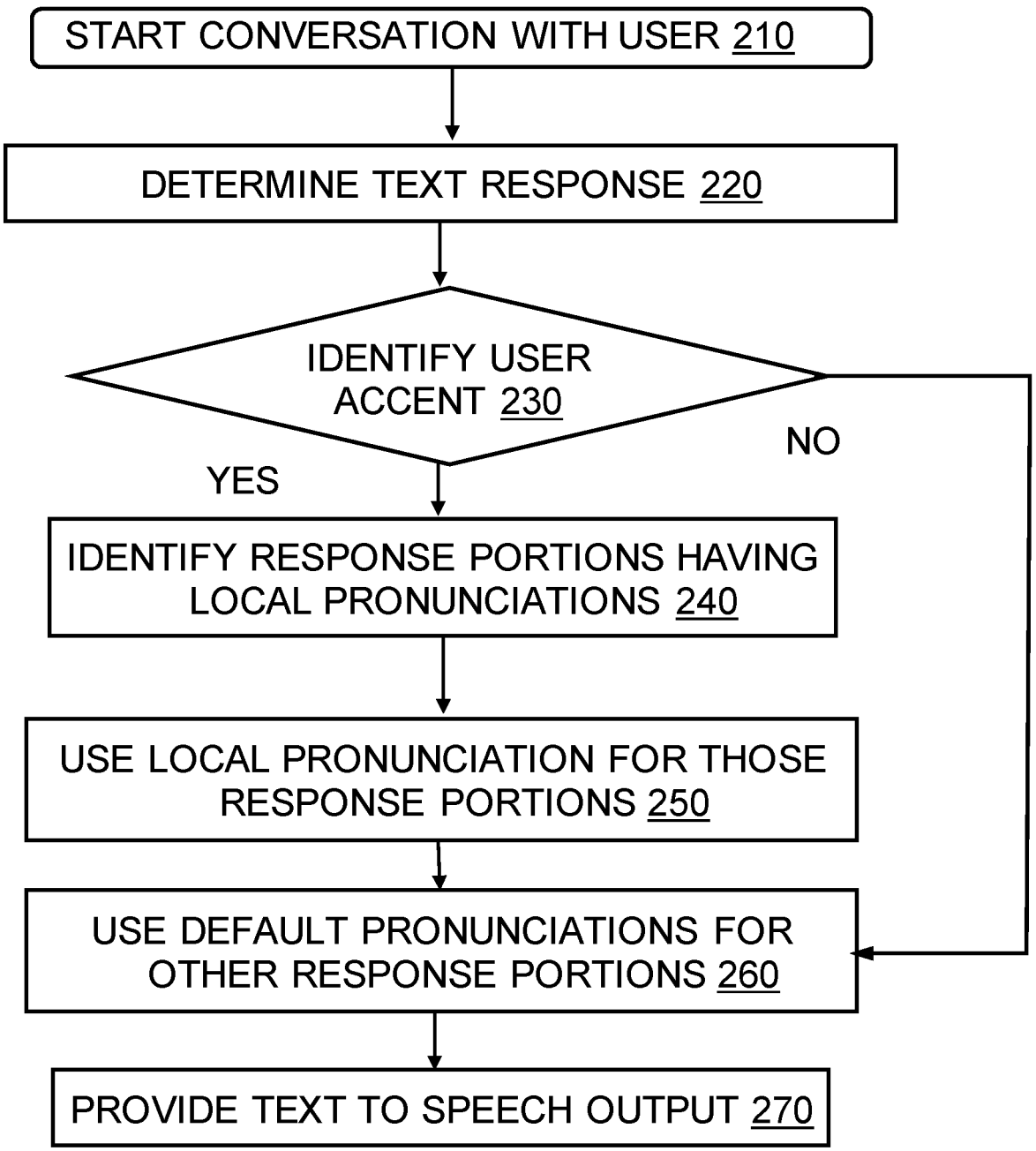
FIG. 2 provides a flowchart depicting an operational sequence, according to an embodiment of the invention.

FIG. 2 provides a flowchart 200, illustrating exemplary activities associated with the practice of the disclosure. After program start, at block 210 a conversation is initiated between a user and an automated question answering system. As part of the conversation, the method receives audio input from the user, converts that audio to text using speech to text technology and passes the text data on for analysis. In an embodiment, the method analyzes the user's audio data and extracts phoneme sequences from the audio. The method matches the sequence of phoneme sequences from the audio to the text data from the speech to text.

At block 220, the method uses an automated question answering system decision tree, or other automated response generator, to determine a textual response to the text data associated with the user's input for the conversation.

At decision point 230, the method attempts to identify a user's accent using phoneme sequence—text pairings extracted from the user's audio input data received by the system. In an embodiment, the method utilizes a machine learning classification model to identify a user's accent. In an embodiment, the method matches phoneme sequence—text parings with a corpus of phoneme sequence text pairings in a database.

For user's having a successfully identified accent, the method proceeds to identify portions of the text response having matches in a region-specific pronunciation dictionary built for use in the system, at block 240.

For user's lacking a successfully identified accent, the method proceeds to block 260 and generates a phoneme text to speech sequence for the determined response of block 220. For such users, the method utilizes default phoneme sequences for the portions of the determined response.

At block 250, the method generates an overall phoneme sequence for the determined response of block 220, using the local pronunciation phoneme sequences for response portions identified at block 240. The local pronunciation phoneme sequences for portions identified at block 240, are combined at block 260, with default phoneme sequences for all other portions of the determined response from block 220. The local pronunciations from the region-specific pronunciation dictionary correspond to the most common pronunciation of the response term derived from audio data collected from multiple individuals having the same accent as that of the current user.

At block 270, the method provides the final overall phoneme sequence corresponding to the determined response of block 220, to a user as a text to speech audio output. The output may be provided directly to a user using a local system speaker or may be provided over a communications network to a user device including such devices as a local computer, a tablet computer, a land-line telephone, or a mobile telephone, interfacing with the QA system.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
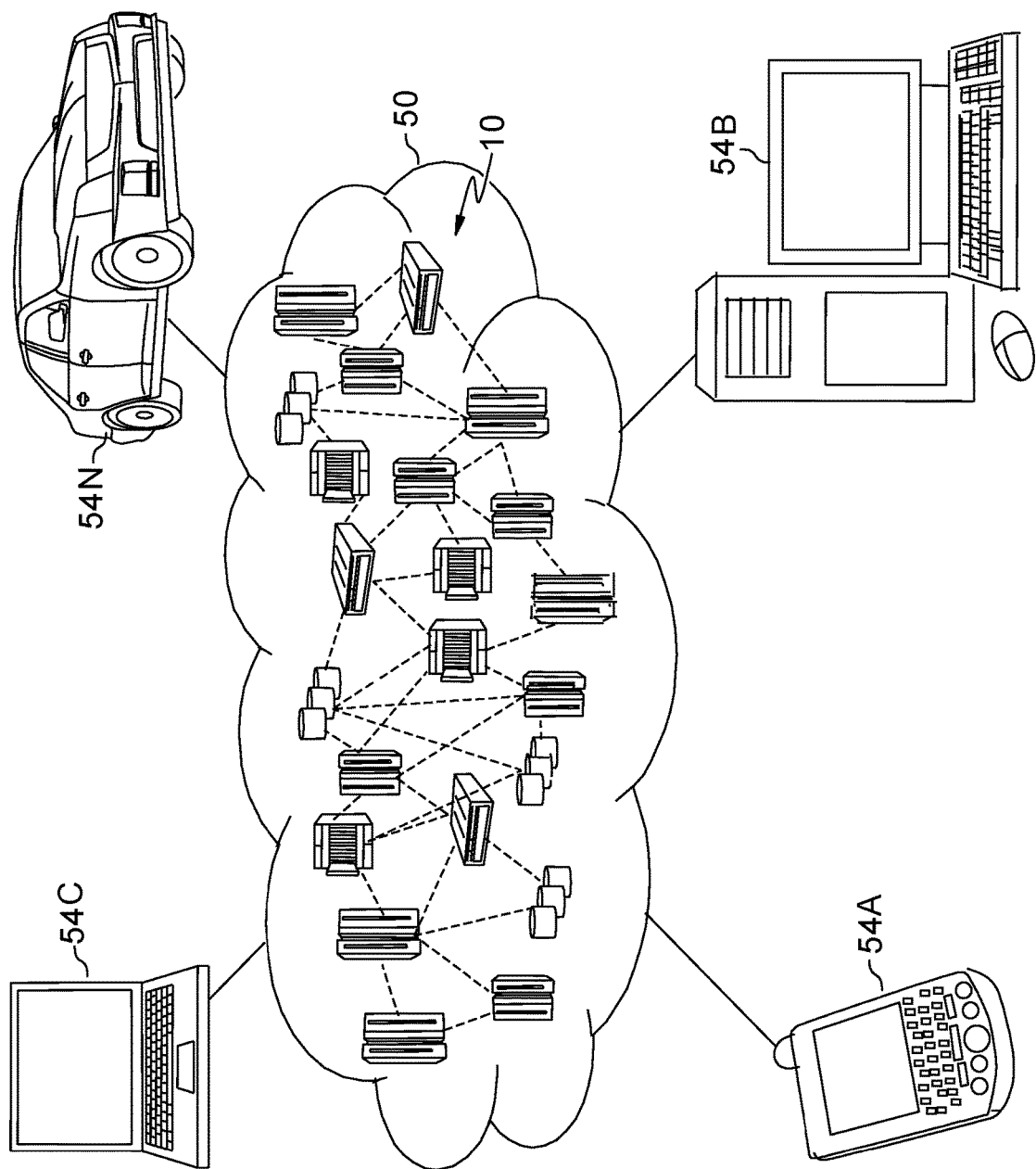
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
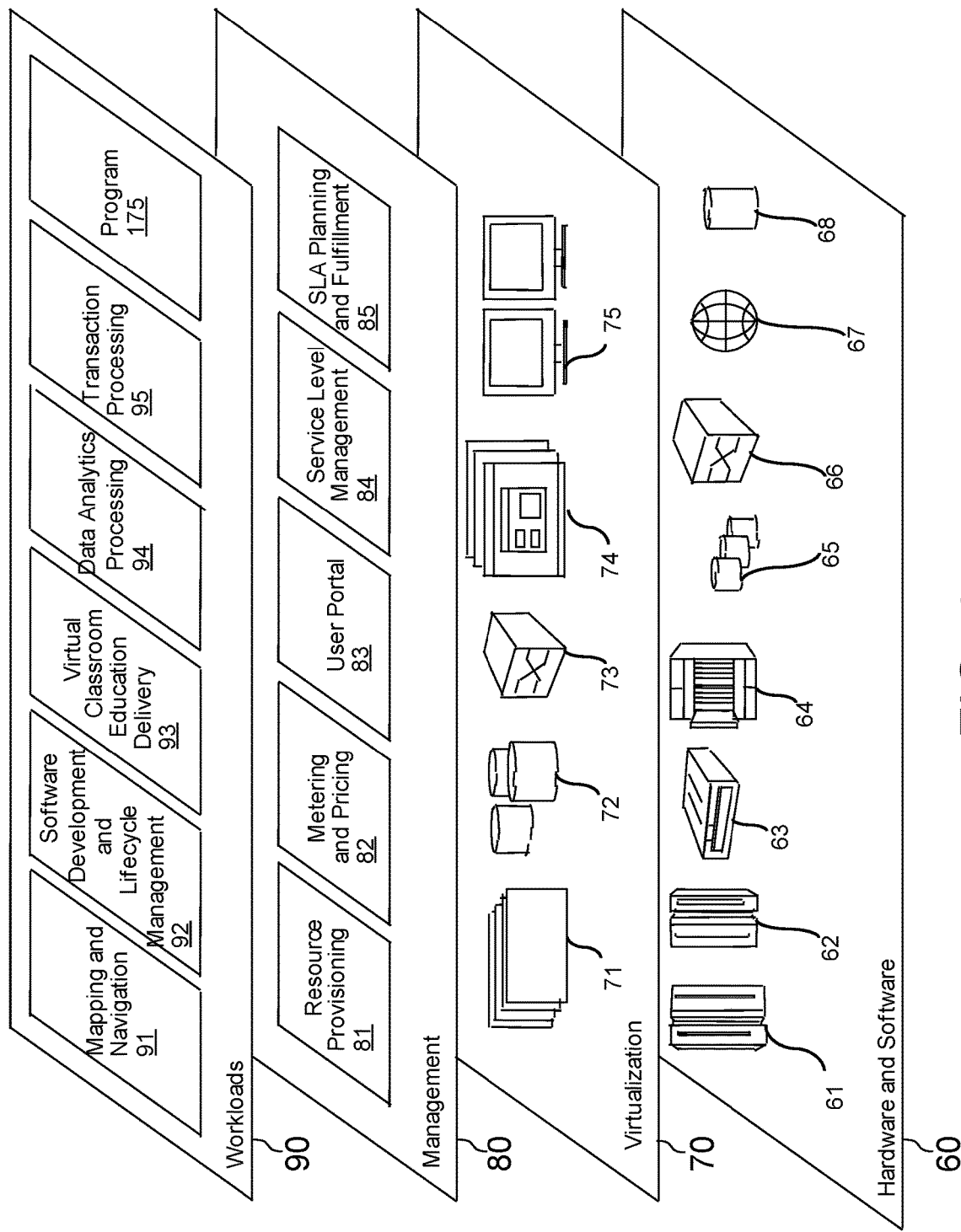
FIG. 4 depicts abstraction model layers, according to an embodiment of the invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automated conversation program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for providing a text to speech output, the method comprising:
   receiving user audio data;
   determining, by the one or more computer processors, a string of text corresponding to the user audio data;
   determining, by the one or more computer processors, a string of phonemes corresponding to the user audio data;
   determining, by one or more computer processors, a user region-specific-pronunciation classification according to the string of phonemes;
   determining, by the one or more computer processors, text for a response to the user according to the string of text;

identifying, by the one or more computer processors, a portion from the text for a response, wherein a region specific-pronunciation dictionary comprises the portion;

using, by the one or more computer processors, a phoneme string, from the region-specific-pronunciation dictionary selected according to the user region-specific pronunciation classification, for the portion in a text to speech output to the user; and providing an audio text to speech output including the portion to the user using a system speaker.

2. The computer implemented method according to claim 1, further comprising:

using, by the one or more computer processors, a default phoneme sequence in the text to speech output to the user for words from the text absent from the region-specific-pronunciation dictionary.

3. The computer implemented method according to claim 1, further comprising building the region-specific-pronunciation dictionary by:

receiving, by the one or more computer processors, audio data from a plurality of speakers, the audio data comprising domain-specific portions and region-specific pronunciations of the domain-specific portions;

classifying, by the one or more computer processors, the audio data according to a region-specific-pronunciation;

determining, by the one or more computer processors, a most common region-specific pronunciation for a domain-specific portion; and storing, by the one or more computer processors, the most common region-specific pronunciation for the domain-specific portion as the phoneme string for the domain-specific portion-region specific pronunciation combination.

4. The computer implemented method according to claim 3, further comprising:

defining, by the one or more computer processors, domain-specific portions.

5. The computer implemented method according to claim 3, further comprising:

converting, by the one or more computer processors, the audio data to text data; and scanning, by the one or more computer processors, the text data for domain-specific portions.

6. The computer implemented method according to claim 1, wherein the portion comprises at least one of a word, an n-gram, and a phrase.

7. The computer implemented method according to claim 1, further comprising:

determining, by the one or more computer processors, a user text from the audio data:

determining, by the one or more computer processors, a response according to the user text;

scanning, by the one or more computer processors, the response for domain portions; and matching, by the one or more computer processors, a domain portion with a region-specific pronunciation dictionary entry.

8. A computer program product for providing a text to speech output, the computer program product comprising one or more computer readable storage devices and collectively stored program instructions on the one or more computer readable storage devices, the stored program instructions comprising:

program instructions to receive user audio data;

program instructions to determine a string of text corresponding to the user audio data;

program instructions to determine a string of phonemes corresponding to the user audio data;

program instructions to determine a user region-specific-pronunciation classification according to the string of phonemes;

program instructions to determine text for a response to the user according to the string of text;

program instructions to identify a portion from the text for a response, wherein a region-specific-pronunciation dictionary comprises the portion;

program instructions to use a phoneme string, from the region-specific-pronunciation dictionary selected according to the user region-specific pronunciation classification, for the portion in a text to speech output to the user; and program instructions to provide an audio text to speech output including the portion, to the user using a system speaker.

9. The computer program product according to claim 8, the stored program instructions further comprising:

program instructions to use a default phoneme sequence in the text to speech output to the user for words from the text absent from the region-specific-pronunciation dictionary.

10. The computer program product according to claim 8, the stored program instructions further comprising program instructions to build the region-specific-pronunciation dictionary by:

receiving audio data from a plurality of speakers, the audio data comprising domain-specific portions and region-specific pronunciations of the domain-specific portions;

classifying the audio data according to a region-specific-pronunciation;

determining a most common region-specific pronunciation for a domain-specific portion; and storing the most common region-specific pronunciation for the domain-specific portion as the phoneme string for the domain-specific portion-region specific pronunciation combination.

11. The computer program product according to claim 10, the stored program instructions further comprising:

program instructions to define domain-specific portions.

12. The computer program product according to claim 10, the stored program instructions further comprising:

program instructions to convert the audio data to text data; and program instructions to scan the text data for domain-specific portions.

13. The computer program product according to claim 8, wherein the portion comprises at least one of a word, an n-gram, and a phrase.

14. The computer program product according to claim 8, the stored program instructions further comprising:

program instructions to determine a user text from the audio data:

program instructions to determine a response according to the user text;

program instructions to scan the response for domain portions; and program instructions to match a domain portion with a region-specific pronunciation dictionary entry.

15. A computer system for providing a text to speech output, the computer system comprising:

one or more computer processors;

one or more computer readable storage devices; and stored program instructions on the one or more computer readable storage devices for execution by the one or more computer processors, the stored program instructions comprising:

program instructions to receive user audio data;

program instructions to determine a string of text corresponding to the user audio data;

program instructions to determine a string of phonemes corresponding to the user audio data;

program instructions to determine a user region-specific-pronunciation classification according to the string of phonemes;

program instructions to determine text for a response to the user according to the string of text;

program instructions to identify a portion from the text for a response, wherein a region-specific-pronunciation dictionary comprises the portion;

program instructions to use a phoneme string, from the region-specific-pronunciation dictionary selected according to the user region-specific pronunciation classification, for the portion in a text to speech output to the user; and program instructions to provide an audio text to speech output including the portion, to the user using a system speaker.

16. The computer system according to claim 15, the stored program instructions further comprising:

program instructions to use a default phoneme sequence in the text to speech output to the user for words from the text absent from the region-specific-pronunciation dictionary.

17. The computer system according to claim 15, the stored program instructions further comprising program instructions to build the region-specific-pronunciation dictionary by:

receiving audio data from a plurality of speakers, the audio data comprising domain-specific portions and region-specific pronunciations of the domain-specific portions;

classifying the audio data according to a region-specific-pronunciation;

determining a most common region-specific pronunciation for a domain-specific portion; and storing the most common region-specific pronunciation for the domain-specific portion as the phoneme string for the domain-specific portion-region specific pronunciation combination.

18. The computer system according to claim 17, the stored program instructions further comprising:

program instructions to define domain-specific portions.

19. The computer system according to claim 17, the stored program instructions further comprising:

program instructions to convert the audio data to text data; and program instructions to scan the text data for domain-specific portions.

20. The computer system according to claim 15, wherein the portion comprises at least one of a word, an n-gram, and a phrase.

* * * * *